UNITED STATES PATENT OFFICE 2,332,388

AZO DYESTUFF INTERMEDIATES

Neil Mitchill Mackenzie, Bound Brook, N. J., assignor to American Cyanamid Company, New York, N. Y., a corporation of Maine No Drawing. Original application June 7, 1941, Serial No. 397,086. Divided and this application August 26, 1942, Serial No. 456,269

7 Claims. (Cl. 260—513)

This invention relates to sulfonic acid derivatives of acetoacetic amides and to a method for preparing these compounds which have the following general formula:

$$CH_3COCH_2CONHRX$$

in which R is a saturated organic radical, X is a radical included in the group consisting of $SO_3H$ and its salts.

The products of the present invention may be prepared by reacting diketene with saturated amino sulfonic acids. It is known that in many reactions amino sulfonic acids do not behave like other amines and are, rather, internal salts or hybrid ions and it is therefore surprising that amino sulfonic acids can be readily reacted with diketene to give corresponding sulfonic acid derivatives of acetoacetic amides.

The reaction is carried out preferably in aqueous medium and the pH depends upon the specific compound to be reacted, although the preferred pH range is 4 to 7 since at a lower pH most of the amino sulfonic acids are not sufficiently soluble and at a higher pH the yield is usually lower. In most cases room temperature is suitable although a temperature of 40-50° C. is preferred if it is desirable to increase the solubility of the amino sulfonic acid. The reactions are slightly exothermic and in some cases cooling of the reaction is advisable.

As examples of suitable aminosulfonic acids which may be reacted with diketene to give the sulfonic acid derivatives of the corresponding acetoacetic amide there may be mentioned taurine, 1-amino-propane-2-sulfonic acid, 2-amino-2-methyl-propane sulfonic acid, amino cyclohexane sulfonic acid, amino methane sulfonic acid.

Most of the products of this invention are very soluble in water and in most cases it is necessary to evaporate the solution in order to isolate the compound, while in some cases the products may be salted out. If the compounds are to be used as coupling components in preparing azo dyes it is not necessary to effect their isolation as any by-products present do not enter into the coupling.

These intermediates are useful as coupling components for making azo dyes derived from acetoacetic amides and having sulfonic groups in the substituent of the amide radical. Of particular interest are those azo dyes that are obtained from diazo components having in the ortho position to the azo group a group enhancing complex formation with heavy metals. Such azo dyes may be converted into metallized dyes which are very valuable for dyeing wool.

The invention is illustrated but not limited by the following examples in which the parts are given by weight.

Example 1

12.5 parts of 1-aminoethane-2-sulfonic acid are added to a solution of 1.0 part of crystalline sodium acetate in 55 parts of water and stirred to a smooth slurry. Then 9.8 parts of diketene are added over a period of seven hours during good stirring at 20-25° C. During the addition of diketene, the pH is held at 5-7 by the continuous addition of 10% sodium carbonate solution. At the end of the reaction the 1-aminoethane-2-sulfonic acid disappears and a clear solution is formed. This solution can be used directly in the manufacture of azo dyes, or the new product can be isolated by evaporation. This new product may be represented by the following formula:

$$CH_3COCH_2CONHCH_2CH_2SO_3Na$$

Example 2

By the method outlined in Example 1 diketene will react with amino-methane sulfonic acid (obtained from formaldehyde-bisulfite and ammonia as described by F. Raschig and W. Prahl in Justus Liebig's "Annalen der Chemie," volume 448, page 265) to form a water soluble sulfonic acid which, in the form of its sodium salt has the following structure:

$$CH_3COCH_2CONHCH_2SO_3Na$$

It is valuable as an intermediate for the preparation of azo dyestuffs.

This application is a division of my copending application Serial No. 397,086, filed June 7, 1941.

What I claim is:

1. A method for preparing compounds corresponding to the formula $$CH_3COCH_2CONHRX$$

in which R is a saturated hydrocarbon radical and X is a member of the group consisting of $SO_3H$ and its salts by reacting diketene with a compound included in the group consisting of the corresponding amino sulfonic acids and their salts.

2. A method according to claim 1 in which the reaction is carried out in an aqueous medium at a pH of between 3 and 9.

3. New products having the following formula:

$$CH_3COCH_2CONHRX$$

in which R is a saturated hydrocarbon radical, and X is a member of the group consisting of $SO_3H$ and its salts.

4. New products according to claim 3 in which R is a saturated aliphatic hydrocarbon radical.

5. New products having the following formula:

$$CH_3COCH_2CONHRSO_3Y$$

in which R is alkylene and Y is a cation.

6. New products having the following formula:

$$CH_3COCH_2CONH.CH_2SO_3Y$$

in which Y is a cation.

7. New products having the following formula:

$$CH_3COCH_2CONHCH_2CH_2SO_3Y$$

in which Y is a cation.

NEIL MITCHILL MACKENZIE.